O. LINDER.
MANUFACTURE OF NON-OXIDIZING CONDUCTORS.
APPLICATION FILED JAN. 3, 1914.
1,104,054.
Patented July 21, 1914.
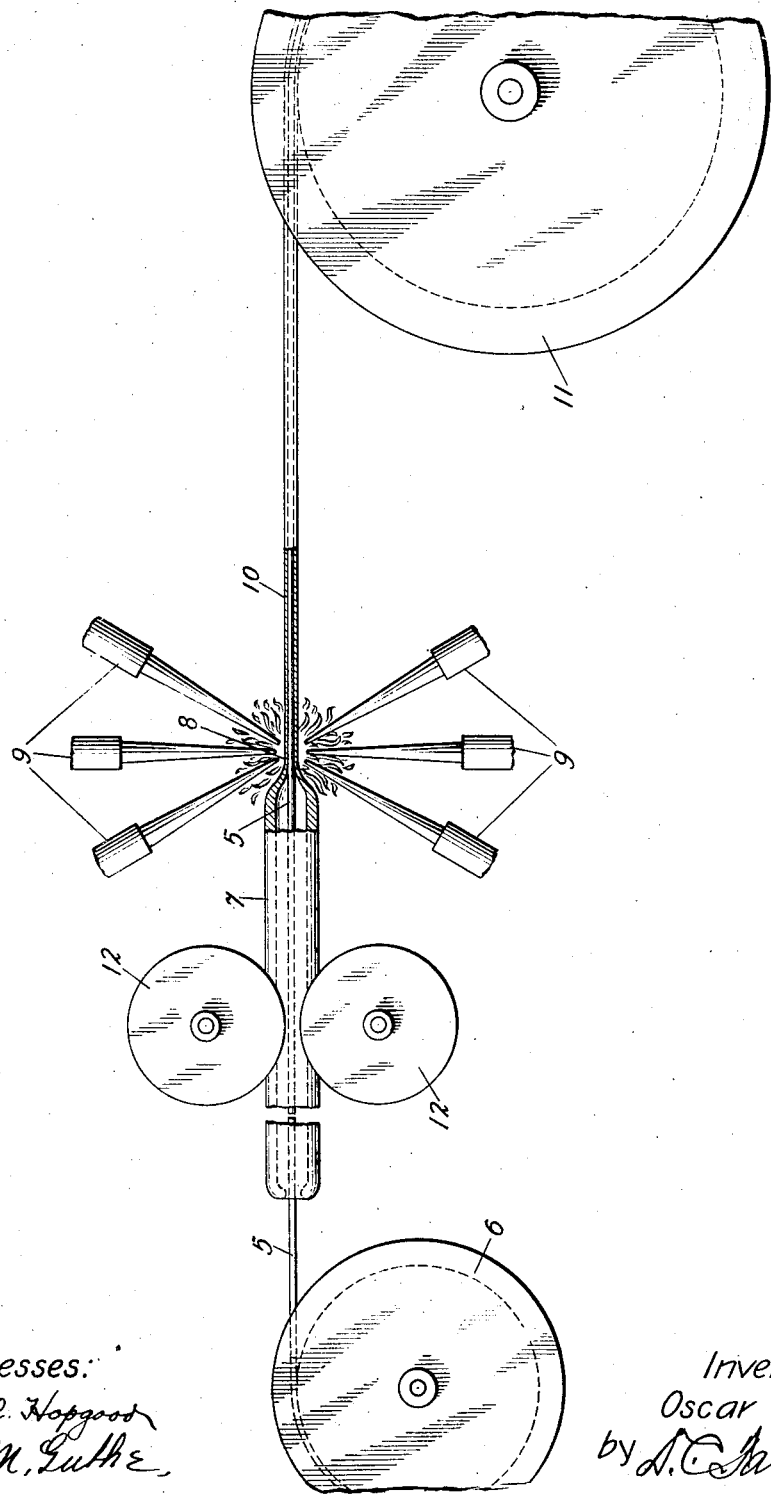
Witnesses:
Roy C. Hopgood
O.D.M. Luthe
Inventor:
Oscar Linder.
by D.C. Tanner
Atty.

UNITED STATES PATENT OFFICE.

OSCAR LINDER, OF CHICAGO, ILLINOIS, ASSIGNOR TO WESTERN ELECTRIC COMPANY, OF NEW YORK, N. Y., A CORPORATION OF ILLINOIS.

MANUFACTURE OF NON-OXIDIZING CONDUCTORS.

1,104,054. Specification of Letters Patent. Patented July 21, 1914.

Application filed January 3, 1914. Serial No. 810,197.

*To all whom it may concern:*

Be it known that I, OSCAR LINDER, a citizen of Switzerland, residing at Chicago, in the county of Cook and State of Illinois, have invented a certain new and useful Improvement in the Manufacture of Non-Oxidizing Conductors, of which the following is a full, clear, concise, and exact description.

This invention relates to the manufacture of non-oxidizing conductors, and has for its object the production of efficient, reliable and economical non-oxidizing conductors. Such non-oxidizing conductors are particularly adapted for use as leading-in wires for incandescent lamps.

In accordance with this invention, oxidizable metal, such, for example, as iron, copper, etc., in the form of wire or strip, is covered with a thin, uniform and continuous coating of vitreous material in such manner as to prevent the oxidizing of the metal and at the same time rendering it sufficiently pliable and workable to lend itself readily to the work for which it is intended.

The method herein referred to is substantially as follows: Vitreous material having a point of plasticity lower than the melting point of the metal forming the conductor, is applied at one point of a constantly moving conductor of oxidizable metal. The covering of the conductor is then permitted to cool and the conductor so covered may be wound upon a take-up reel.

This invention will be more fully understood by reference to the accompanying drawing, which illustrates one embodiment of the invention.

As shown in the drawing, a wire 5 of iron or some other oxidizable metal is led from a supporting reel 6 into and through a tube 7 of Bohemian glass, lead glass, Jena glass or some other suitable vitreous material which becomes plastic below the melting point of the metal to be covered. The end 8 of the tube 7 at which the wire 5 emerges, is maintained in a plastic state by some suitable means, such, for example, as gas blast burners 9. As the wire 5 is drawn through the plastic end 8 of the tube 7, a thin coating of glass is applied to the wire, as shown at 10. The glass covered wire is then fed onto a take-up reel 11. The tube 7 may be fed forward by any suitable means, such, for example, as feed rollers 12. When heating the tip of the tube 7, it is only necessary to raise the temperature thereof sufficiently high to render the end 8 slightly plastic. In fact it is desirable that the temperature be no higher, so that the continuity of the glass may be maintained, thereby preventing the flame from contacting with the wire. However, in order that intimate contact between the wire and glass coating may be insured, it is necessary that the glass coating, after application thereof to the wire, be raised to such a temperature that it becomes thoroughly plastic. For the accomplishment of these purposes, the position of the flame with respect to the tip of the tube is as illustrated in the drawing, that is, the glass coated wire is in contact with and passes through the hottest part of the flame, while the tip of the glass tube is heated by radiation and conduction and to a lower temperature than the glass coating on the wire.

Experiments have shown that in covering a wire of .007" diameter with a coating of Bohemian glass of .002" thickness, the best results are obtained when using a tube having an inside diameter of 1/8" and a thickness of wall of 3/64". With these dimensions of wire and tube, the feeding speed of the tube should be 3/64" per minute, and that of the wire 2' per minute. The diameter of the reel 11 should be relatively large (about 1') to prevent the breaking of the glass as the glass coated wire is wound thereon. While any means may be employed to maintain the end of the tube in a plastic state, it has been determined that the best results are obtained when using an open flame, care being taken to insure only the extreme tip of the tube being in a plastic state and to prevent the flame coming in contact with the wire.

What is claimed is:

1. The method of making a non-oxidizable conductor which consists in drawing an oxidizable metallic wire through a tube of vitreous material, maintaining the forward end of said tube in a plastic state, and causing it to adhere to said wire in the form of a thin, uniform and continuous coating.

2. The method of making a non-oxidizing conductor which consists in drawing an oxidizable metallic strip through a tube of vitreous material, maintaining said vitreous material at the end where said strip emerges in a plastic state, and feeding said tube forward at a rate sufficient to apply a thin, uniform and continuous coating of said vitreous material on said strip.

3. The method of making a non-oxidizable conductor which consists in drawing a suitable metallic wire through a tube of vitreous material, maintaining the forward end of said tube in a plastic state, feeding said tube forward at a speed sufficient to cover said wire with a thin, uniform and continuous coating of said vitreous material, and winding said covered wire upon a reel.

4. The method of making a non-oxidizing conductor which consists in drawing the oxidizable metallic wire through a tube of vitreous material, maintaining the forward end of said tube in a plastic state without oxidizing said inclosed wire, feeding said tube forward at a speed sufficient to enable said wire to be covered with a thin, uniform and continuous coating of said material in intimate contact therewith.

5. The method of making a non-oxidizing conductor which consists in drawing the oxidizable metallic wire through a tube of vitreous material having a point of plasticity lower than the melting point of said wire, maintaining the forward end of said tube in a plastic state without oxidizing said wire, and causing said vitreous material to adhere to said wire in the form of a thin, uniform and continuous coat.

6. The method of making a non-oxidizing conductor which consists in enveloping an oxidizable metallic wire with a tube of vitreous material, maintaining the forward end of said tube in a plastic state and advancing said wire and said tube at such relative speeds that a thin, uniform and continuous coating of said vitreous material adheres to said wire.

7. The method of making a non-oxidizing conductor which consists in drawing an oxidizable metallic wire through a tube of vitreous material, maintaining the forward end of said tube in a slightly plastic state, causing said vitreous material to form a thin, uniform and continuous tube on said wire, and maintaining said thin tube in a thoroughly plastic state near the point of application whereby said wire and said vitreous material are in intimate contact.

8. The method of making a non-oxidizing conductor which consists in passing an oxidizable metallic wire through a tube of vitreous material, heating the tip of said tube to render it sufficiently plastic to adhere to said wire, and subsequently heating the coated wire to a greater intensity whereby said vitreous material is caused to form a coating in intimate contact with said wire.

In witness whereof, I hereunto subscribe my name this 24th day of December A. D., 1913.

OSCAR LINDER.

Witnesses:
MARIE H. CADIEUX,
EDWIN C. FROST.